(12) United States Patent
Karunakaran

(10) Patent No.: US 11,487,512 B2
(45) Date of Patent: Nov. 1, 2022

(54) GENERATING A SERVICES APPLICATION

(71) Applicant: Microsoft Technology Licensing, LLC, Redmond, WA (US)

(72) Inventor: Rajeev Karunakaran, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 85 days.

(21) Appl. No.: 15/083,984

(22) Filed: Mar. 29, 2016

(65) Prior Publication Data
US 2017/0286069 A1  Oct. 5, 2017

(51) Int. Cl.
G06F 16/332 (2019.01)
G06F 8/35 (2018.01)
G06F 16/2452 (2019.01)

(52) U.S. Cl.
CPC ............ *G06F 8/35* (2013.01); *G06F 16/2452* (2019.01)

(58) Field of Classification Search
CPC ...... G06F 8/35; G06F 16/2452; G06F 16/243; G06F 16/3329; G06F 16/3344; G06F 16/24533
See application file for complete search history.

(56) References Cited

U.S. PATENT DOCUMENTS

| | | | |
|---|---|---|---|
| 5,574,782 A | 11/1996 | Baird et al. | |
| 5,748,974 A * | 5/1998 | Johnson | G06F 3/038 704/9 |
| 6,549,937 B1 | 4/2003 | Auerbach et al. | |
| 6,782,403 B1 | 8/2004 | Kino et al. | |
| 6,879,994 B1 | 4/2005 | Matsliach et al. | |
| 7,103,171 B1 | 9/2006 | Annadata et al. | |
| 7,290,039 B1 | 10/2007 | Lisitsa et al. | |
| 7,315,613 B2 | 1/2008 | Kleindienst et al. | |
| 7,533,149 B2 | 5/2009 | Starbuck et al. | |
| 7,895,246 B2 | 2/2011 | Bauman et al. | |
| 7,903,637 B2 | 3/2011 | Moore et al. | |
| 7,921,214 B2 | 4/2011 | Da Palma et al. | |
| 8,037,449 B2 * | 10/2011 | Iborra | G06F 8/30 717/105 |

(Continued)

FOREIGN PATENT DOCUMENTS

| | | |
|---|---|---|
| CN | 101207585 A | 6/2008 |
| CN | 101207656 A | 6/2008 |

(Continued)

OTHER PUBLICATIONS

JongHyun Lim, Kyong-Ho Lee, Constructing composite web services from natural language requests, Web Semantics: Science, Services and Agents on the World Wide Web 8 (2010), p. 1-13. (Year: 2009).*

(Continued)

Primary Examiner — Lewis A Bullock, Jr.
Assistant Examiner — Mohammad H Kabir
(74) Attorney, Agent, or Firm — Shook, Hardy & Bacon L.L.P.

(57) ABSTRACT

Technologies are described herein for generating a service application. A service application generator can be used to generate a service application upon receiving a prompt to generate the service application. The service application generator can interface with a user or other entity to determine information used to build a service application.

15 Claims, 9 Drawing Sheets

(56) References Cited

U.S. PATENT DOCUMENTS

| | | | |
|---|---|---|---|
| 8,046,737 B2* | 10/2011 | Wittenberg | G06F 8/00 |
| | | | 717/109 |
| 8,121,653 B2 | 2/2012 | Marti et al. | |
| 8,160,054 B2 | 4/2012 | Weiner | |
| 8,171,080 B2 | 5/2012 | Gupta | |
| 8,199,763 B2 | 6/2012 | Sheridan et al. | |
| 8,363,799 B2 | 1/2013 | Gruchala et al. | |
| 8,407,298 B2 | 3/2013 | Kamat et al. | |
| 8,503,650 B2 | 8/2013 | Reding et al. | |
| 8,589,161 B2 | 11/2013 | Kennewick et al. | |
| 8,645,484 B2 | 2/2014 | Ferrell et al. | |
| 8,649,808 B2 | 2/2014 | Neely et al. | |
| 8,700,072 B2 | 4/2014 | Pascal et al. | |
| 8,706,912 B2 | 4/2014 | Baxter, Jr. | |
| 8,793,617 B2 | 7/2014 | Xu et al. | |
| 8,861,537 B1 | 10/2014 | Braithwaite et al. | |
| 8,875,019 B2 | 10/2014 | Tan et al. | |
| 8,881,020 B2 | 11/2014 | Affronti et al. | |
| 8,917,828 B2 | 12/2014 | Bouzid et al. | |
| 9,043,474 B2 | 5/2015 | Schleifer et al. | |
| 9,137,228 B1 | 9/2015 | Newstadt | |
| 9,191,358 B2 | 11/2015 | Long et al. | |
| 9,356,988 B2 | 5/2016 | Shuman et al. | |
| 9,392,053 B2 | 7/2016 | Fausak et al. | |
| 9,413,882 B2 | 8/2016 | Gisby et al. | |
| 9,451,425 B2 | 9/2016 | Pollack et al. | |
| 9,467,545 B1* | 10/2016 | Agranov | G06F 16/951 |
| 9,473,912 B2 | 10/2016 | Circosta et al. | |
| 9,532,197 B1 | 12/2016 | Lew et al. | |
| 9,607,269 B2 | 3/2017 | Daly et al. | |
| 9,794,762 B2 | 10/2017 | Bakos et al. | |
| 9,800,537 B2 | 10/2017 | Talwar et al. | |
| 9,843,543 B2 | 12/2017 | Ghafourifar et al. | |
| 2003/0093480 A1 | 5/2003 | Lagarde et al. | |
| 2005/0135595 A1 | 6/2005 | Bushey et al. | |
| 2005/0216550 A1 | 9/2005 | Paseman et al. | |
| 2007/0043878 A1 | 2/2007 | Carlson et al. | |
| 2007/0150603 A1 | 6/2007 | Crull et al. | |
| 2008/0147406 A1 | 6/2008 | Da palma et al. | |
| 2009/0016504 A1 | 1/2009 | Mantell et al. | |
| 2009/0319918 A1 | 12/2009 | Affronti et al. | |
| 2009/0327441 A1 | 12/2009 | Lee et al. | |
| 2009/0328062 A1 | 12/2009 | Ganesan et al. | |
| 2010/0036923 A1 | 2/2010 | Byrne et al. | |
| 2010/0036926 A1 | 2/2010 | Ahart et al. | |
| 2010/0082750 A1 | 4/2010 | Kunz et al. | |
| 2010/0199340 A1 | 8/2010 | Jonas et al. | |
| 2011/0029923 A1 | 2/2011 | Xu et al. | |
| 2011/0060801 A1 | 3/2011 | Virk et al. | |
| 2011/0196922 A1 | 8/2011 | Marcucci et al. | |
| 2011/0289317 A1 | 11/2011 | Darapu et al. | |
| 2012/0016678 A1* | 1/2012 | Gruber | G06F 17/3087 |
| | | | 704/275 |
| 2012/0093303 A1 | 4/2012 | Schultz | |
| 2012/0185886 A1 | 7/2012 | Charania et al. | |
| 2013/0055099 A1 | 2/2013 | Yao et al. | |
| 2013/0073636 A1 | 3/2013 | Zhu et al. | |
| 2013/0097333 A1 | 4/2013 | Bathurst et al. | |
| 2013/0179521 A1 | 7/2013 | Hu | |
| 2013/0218947 A1 | 8/2013 | Zur et al. | |
| 2013/0246050 A1 | 9/2013 | Yu et al. | |
| 2013/0304829 A1 | 11/2013 | Olsen et al. | |
| 2014/0019483 A1* | 1/2014 | Mohajer | G10L 15/063 |
| | | | 707/771 |
| 2014/0040404 A1 | 2/2014 | Pujare et al. | |
| 2014/0108566 A1 | 4/2014 | Vanscoyk et al. | |
| 2014/0181137 A1* | 6/2014 | Stein | G06F 17/3064 |
| | | | 707/769 |
| 2014/0181864 A1 | 6/2014 | Marshall et al. | |
| 2014/0244661 A1* | 8/2014 | Peiris | G06F 16/243 |
| | | | 707/748 |
| 2014/0314225 A1 | 10/2014 | Riahi et al. | |
| 2015/0066479 A1* | 3/2015 | Pasupalak | G06F 17/27 |
| | | | 704/9 |
| 2015/0135214 A1 | 5/2015 | Reisman | |
| 2016/0044380 A1 | 2/2016 | Barrett | |
| 2016/0050235 A1 | 2/2016 | Ghafourifar et al. | |
| 2016/0062739 A1* | 3/2016 | Kaulgud | G06F 8/72 |
| | | | 717/107 |
| 2016/0119477 A1 | 4/2016 | Sharpe et al. | |
| 2016/0191705 A1 | 6/2016 | Kumar et al. | |
| 2016/0219149 A1 | 7/2016 | Krishnan et al. | |
| 2017/0048170 A1 | 2/2017 | Smullen et al. | |
| 2017/0118341 A1 | 4/2017 | Kelly et al. | |
| 2017/0186018 A1 | 6/2017 | Nandi et al. | |
| 2017/0279759 A1 | 9/2017 | Liden et al. | |
| 2017/0279906 A1 | 9/2017 | Laird-mcconnell et al. | |
| 2018/0137295 A1 | 5/2018 | Sharma | |
| 2020/0153918 A1 | 5/2020 | Laird-mcconnell et al. | |
| 2021/0117881 A1* | 4/2021 | Sanchez Merchan | |
| | | | G06F 40/211 |

FOREIGN PATENT DOCUMENTS

| | | | | |
|---|---|---|---|---|
| CN | 101286161 A | 10/2008 | | |
| CN | 102067169 A | 5/2011 | | |
| CN | 102150443 A | 8/2011 | | |
| CN | 102262634 A | 11/2011 | | |
| CN | 102750270 A | 10/2012 | | |
| CN | 104796313 A | 7/2015 | | |
| CN | 104954232 A | 9/2015 | | |
| EP | 2141901 A1 | 1/2010 | | |
| GB | 2547888 A * | 9/2017 | | G06F 40/211 |
| WO | 9953676 A1 | 10/1999 | | |
| WO | 2013155619 A1 | 10/2013 | | |
| WO | WO2015116708 A1 | 8/2015 | | |

OTHER PUBLICATIONS

JongHyun Lim, Kyong-Ho Lee, Constructing composite web services from natural language requests, Web Semantics: Science, Services and Agents on the World Wide Web 8 (2010), p. 1-13. (Year: 2006) (Year: 2009).*

Jong Hyun Lim, Kyong-Ho Lee. "Constructing composite webservices from natural language requests", WebSemantics:Science, Services and Agents on the World Wide Web 8, 2009, p. 1-13.*

"International Search Report and Written Opinion Issued in PCT Application No. PCT/US2017/023922", dated Jun. 23, 2017, 10 Pages.

Han et al., "NLify: Lightweight spoken natural language interfaces via exhaustive paraphrasing," Sep. 8-12, 2013, UbiComp '13, ACM Internation Joint Conference on Pervasive and Ubiquitous Computing, 10 pages.

"LUIS Tutorial," Published on: Feb. 20, 2016, Available at: https://www.luis.ai/Help#Overview, 46 pages.

Sateli et al., "Smarter mobile apps through integrated natural language processing services," Aug. 26, 2013, Proceedings of 10th International Conference on Mobile Web Information Systems MobiWIS, 15 pages.

Williams et al., "Fast and easy language understanding for dialog systems with Microsoft Language Understanding Intelligent Service (LUIS)," Sep. 2015, Proceedings of SIGDIAL Conference, 3 pages.

"e-Messaging for e-Mail & SMS Communications", Retrieved From: http:/www.pbinsight.co.in/products/customer-communication-mgmt/document-comp/e-mail-sms-comms/e-messaging3/, Retrieved On: Oct. 6, 2015, 2 Pages.

"Message Systems Resources", Retrieved From: https://www.messagesystems.com/resources/glossary/cross-channel-communication, Feb. 13, 2014, 2 Pages.

"Momentum All-in-One Platform for Email, Mobile, Data & Analytics", Retrieved From: https://www.messagesystems.com/products/momentum-platform, Retrieved on: Feb. 15, 2016, 6 Pages.

"Nimbuzz: Free Calls & Messaging 3.2.0", Retrieved From: https://nimbuzz-free-calls-and-messaging.soft112.com/, Oct. 1, 2014, 8 Pages.

"Zup: Inter-Social Network Communication Tool", Retrieved From: http://www.orangeinks.com/tips-n-tricks/zup-inter-social-network-communication-tool/, Jun. 14, 2008, 4 Pages.

(56) References Cited

OTHER PUBLICATIONS

"Final Office Action Issued in U.S. Appl. No. 15/083,019", dated: Jul. 5, 2018, 29 Pages.
"Non-Final Office Action Issued in U.S. Appl. No. 15/083,019", dated Feb. 2, 2018, 25 Pages.
Williams, Alex, "Zapier Opens Its Developer Platform, Gives The Everyday Joe A Way To Connect APIs", Retrieved From: https://techcrunch.com/2014/01/17/zapier-opens-its-developer-platform-gives-the-everyday-joe-a-way-to-connect-apis/, Jan. 17, 2014, 7 Pages.
"Non-Final Office Action Issued in U.S. Appl. No. 15/083,118", dated Jan. 10, 2018, 9 Pages.
"International Search Report and Written opinion issued in PCT Application No. PCT/US2017/023496", dated Jun. 7, 2017, 13 Pages.
"International Search Report and Written opinion issued in PCT Application No. PCT/US2017/023500", dated May 30, 2017, 14 Pages.
"Non Final Office Action Issued In U.S. Appl. No. 15/083,019", dated Nov. 19, 2018, 31 Pages.
Halder, Soumen, "Use Your Webcam With Multiple Programs Simultaneously", Retrieved From: https://www.https://www.maketecheasier.com/use-webcam-with-multiple-programs/, Jan. 25, 2011, 6 Pages.
"Office Action Issued in European Patent Application No. 17714382.3", dated Sep. 27, 2019, 4 Pages.
"Office Action Issued in European Patent Application No. 17715028.1", dated Mar. 11, 2020, 8 Pages.
First Office Action and Search Report Issued in Chinese Patent Application No. 201780018284.9, dated Jun. 16, 2020, 11 Pages.
"First Office Action and Search Report Issued in Chinese Patent Application No. 201780019972.7", dated May 27, 2020, 16 Pages.
"Summons to Attend Oral Proceedings Issued in European Patent Application No. 17715028.1", Mailed Date: Jul. 10, 2020, 9 Pages.
"Notice of Allowance Issued in U.S. Appl. No. 16/744,827", dated Mar. 8, 2021, 11 Pages.
"Office Action Issued in European Patent Application No. 17714382.3", dated Sep. 25, 2020, 5 Pages.
"Second Office Action Issued in Chinese Patent Application No. 201780019972.7", dated Dec. 23, 2020, 6 Pages.
"First Office Action Issued in Chinese Patent Application No. 201780021448.3", dated Apr. 25, 2021, 20 Pages.
"Second Office Action Issued in Chinese Patent Application No. 201780021448.3", dated Sep. 9, 2021, 13 Pages.
"Search Report Issued in European Patent Application No. 22154363.0", dated Apr. 20, 2022, 10 Pages.
"Final Office Action Issued in U.S. Appl. No. 15/083,019", dated May 2, 2019, 36 Pages.

\* cited by examiner

FIG. 5 http://finance.company1.com/webservice/v1/symbols/companyA/quote?format=json — 502

500

504

```
{
"LIST": {
"META": {
"TYPE": "RESOURCE-LIST",
"START": 0,
"COUNT": 1
},
"RESOURCES": [
{
"RESOURCE": {
"CLASSNAME": "QUOTE",
"FIELDS": {
"NAME": "COMPANY A",      — 506
"PRICE": "34.220001",      — 510
"SYMBOL": "COMPA",         — 508
"TS": "1457374495",
"TYPE": "EQUITY",
"UTCTIME": "2016-03-07T18:14:55+0000",
"VOLUME": "13261865"
}
}
}
]
}
}
```

GENERATING A SERVICES APPLICATION

BACKGROUND

Conversational assistants (e.g. service applications) can receive an input from a user and respond with an action. For example, a conversational assistant can accept a query, transform the query to a search string, search a database, and respond to the user with the results of the search. In another example, conversational assistants can provide users with the ability to form actions using verbal directives or other inputs. A conversational assistant can receive an input to order a product from a company, convert the input to a command, and then send the command to the company. In some examples, data received from a conversational assistant can be copied and pasted into other applications, such as text messaging or email, to share the information.

Although current technologies can enable users to communicate with computing systems using a conversation-based format, existing systems still leave much to be desired. For instance, a number of existing system require users to manually process, e.g., cut and paste, data associated with some conversational assistants in order to obtain a desired outcome. Such issues can lead to a number of inefficiencies and mistakes.

It is with respect to these and other considerations that the disclosure made herein is presented.

SUMMARY

Technologies are described herein for generating a service application. A service application generator can be used to generate a service application upon receiving a prompt to generate the service application. In some implementations using conventional technologies, a user can define the parameters of a service application for use by the user, another user, or another entity. The system can receive a plurality of intents to be handled by the system from a user. In some examples, the system may have one or more intents predefined. Thus, in some examples, the user can define one or more intents or the user can select from a list of predefined intents.

If not already provided by the system, the user defines an application function associated with the one or more intents. The application function defines the action to be taken for a particular intent. In some examples, the application function can include a data communication path to a "web service," which is service made available from a Web server. For example, the data communication path can be a uniform resource locator to a RESTful service. The application function defines a data source, such as the web service, from which information is to be retrieved to satisfy a query.

The user defines where in the application function to insert one or more entities into the application function. As used herein, an "entity" is the subject of an intent. The user causing the generation of the service application may not know the particular entity at the time of defining the information for the service application. Thus, in this stage (i.e. definition time), the user may identify a location, or slot, in which the entity information, when known, is to be inserted to execute the application function. For example, the application function may be the URL, www.getstockquote.com/#. The user may define that the "#" is the location in which to insert the entity prior to execution of the application function. In some examples, during the time in which the service application is used (i.e. execution time), the system can analyze a query submitted by the user of the service application and derive the entity (along with the intent) from the query.

Once the data source is identified, the service application generator receives from the user one or more value paths. The value path can be code that is used by the service application when accessing the data source that identifies data values to retrieve from the data source. In some examples, the data source can provide the code to service the query. The service application associates the information with the intent handler to generate the service application.

At definition time, the user can define the manner in which the retrieved data is presented to a user using the service application. For example, the user can specify a "human-language" type of format in which the information is presented in a conversational form.

At execution time, e.g. when a user uses the service application, the system can receive a query from the user. The system can determine an intent and an entity from the query. The system can use the intent to determine the application function to be used and the entity to determine the subject of the information to be retrieved. Using the defined value paths, the system can retrieve data associated with the entity applicable to the intent.

The service application generator can be prompted in various ways to commence interaction with a user to define the parameters of a service application. For example, a user can query a service. Upon a determination that the service does not include a service application that can handle the query, the service can ask the user if the user desires a service application to be generated to handle the query. In another example, a user interface can include a selectable input that, when selected by a user (or other entity), prompts the service application generator to generate a service application. Upon receiving the prompt, the service application generator commences the service application generation process by collecting information used by the to-be-generated service application.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 provides an example of an output format (JSON) that may be used to provide a value path input.

DETAILED DESCRIPTION

Figure 1:
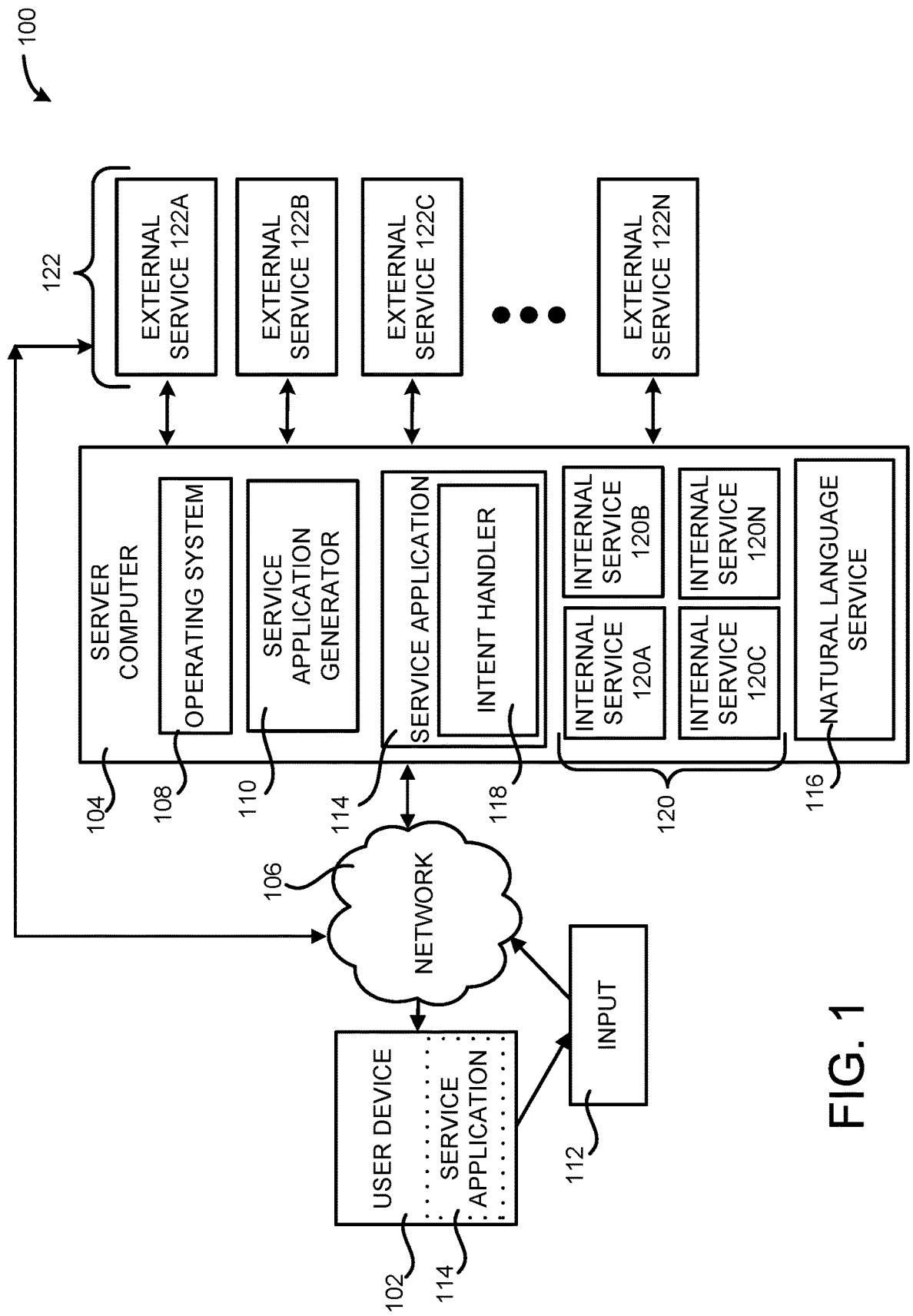
FIG. 1 is a system diagram illustrating an illustrative operating environment for the various technologies disclosed herein.

The following detailed description is directed to technologies for generating a service application. When a query is received from a user that cannot be handled by a conversational assistant, the conversational assistant can provide an output that indicates that the particular query cannot be handled. At this point, the user can either move on with another query or attempt to build an application that can handle the query.

However, building the application can take significant time and knowledge on the part of the user. Further, simply providing an automated process can cause errors. For example, human thought is often highly nuanced, a complex problem made even more complex by the generally accepted use of natural language inputs to conversational assistants. For example, a conversational assistant can be used to set an alarm. The following three different natural language inputs should provide the same action, set an alarm clock: "set alarm for 6:15 am"; "alarm 6:15"; "please set my alarm clock to give an alarm for 6:15 am." If the above inputs were not serviceable or unknown, simply trying to automatically generate a service application to handle the three different inputs can result in different actions for each of the inputs, where one action is intended.

To handle these and other issues, in accordance with the technologies disclosed herein, a service application can be generated by interacting with a user. In some examples, various examples of the technologies described herein can decrease the time and/or effort to generate a service application. In some examples, a user, having little to no programming experience in some examples, can use the service application generator to generate a service application. By providing the use of natural language inputs, as well as other resources, in other examples, a user can generate a service application using the service application generator in a reduced time when compared to conventional manners of generating service applications. Further, by interacting with the user in a particular manner, errors caused by, among other possibilities, incorrect intents can be reduced.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific examples. Referring now to the drawings, in which like numerals represent like elements throughout the several figures, aspects of technologies for generating a service application will be presented.

Referring now to FIG. 1, aspects of one operating environment 100 for the various technologies presented herein will be described. The operating environment 100 shown in FIG. 1 includes a user device 102. According to various configurations, the functionality of the user device 102 can be provided by a personal computer ("PC") such as a desktop, tablet, or laptop computer system. In some other configurations, the functionality of the user device 102 can be provided by other types of computing systems including, but not limited to, a handheld computer, a netbook computer, an embedded computer system, a mobile telephone, a smart phone, or another computing device.

Various aspects of the user device 102 are illustrated and described below. Although the functionality of the user device 102 is primarily described herein as being provided by a tablet or slate computing device, a smartphone, or a PC having a touch-sensitive display, because the functionality described herein with respect to the user device 102 can be provided by additional and/or alternative devices, it should be understood that these examples are illustrative, and should not be construed as being limiting in any way.

The user device 102 is in communication with a server computer 104 through network 106. The server computer 104 is configured to provide functionality for generating a service application. The server computer 104 can be configured to execute an operating system 108 and service application generator 110. The operating system 108 is a computer program for controlling the operation of the user device 102. The service application generator 110 is an executable program configured to execute on top of the operating system 108 to provide various functions.

In some examples, the server computer 104 receives an input 112 from a user (not shown) using the user device 102. The input 112 can vary. For example, the input 112 can be a query for information. In some examples, if the query for information can be handled by a current service application (not shown), the server computer 104 can initiate a service application to handle the query. In other examples, the query can be for information that cannot be handled by a current service application. In other examples, the input 112 can be a request to generate a service application. In these and other examples in which an already generated service application cannot handle the query, the server computer 104 can initiate the service application generator 110.

The service application generator 110 is designed to receive information from the user device 102 and generate a service application 114. In FIG. 1, the service application 114 generated is illustrated as a part of the user device 102 or the server computer 104. It should be understood that the presently disclosed subject matter is not limited to any manner in which the service application 114 is executed. For example, the service application 114 can be executed by the user device 102, the server computer 104, or another device or system not illustrated. In some examples, the service application generator 110 can prompt or instruct the user to provide particular pieces of information the service application generator 110 may need to generate the service application 114. Thus, in some examples, the user may be able to cause the generation of the service application 114 with minimal to no code to be written on the part of the user.

In some examples, the service application generator 110 determines an intent to be used for a particular type of query. In other examples, the service application generator 110 can receive on or more intents from a user. For example, a query for a stock price can include "what is company A trading at," "what is the share price of company A," and "what is the current stock price of company A." These and other similar queries, though different in syntax, have a similar intent: provide the current stock price of company A.

In some examples, the service application generator 110 can generate an intent based on the language of the query. For example, the service application generator 110 can determine separate intents for each of the queries above, the intent being the specific words used in the particular intent. While in some examples this approach may minimize the use of resources, this type of intent generation can be difficult to implement. For example, a user may need to say the exact phrase of the intent in order to invoke a particular service application.

In other examples, the service application generator can use a natural language service 116. The natural language service 116 can associate one or more queries with an intent. An example of a natural language service 116 is the LUIS service provided by MICROSOFT. It should be understood, however, that other natural language processing technologies can be used and are considered to be within the scope of the presently disclosed subject matter.

Once the intent is determined for the particular service application 114, the service application generator 110 identifies an intent handler 118. The intent handler 118 specifies how to process the intent detected by the service application 114. The service application generator 110 also associates the intent handler 118 with a particular entity for the intent. The entity can be the subject of the intent. For example, for the following query, "get stock price of Company A," the intent can be "get stock price" and the entity can be "Company A." In various examples, the intent can be used with multiple entities.

A data source can be used to provide information to the service application 114 to handle the service request from a user. In some examples, the data source can be internal services 120 (hereinafter referred to collectively and/or generically as "internal services 120" and individually as "internal services 120A," internal services 120B," and so forth) or external services 122 (hereinafter referred to collectively and/or generically as "external services 122" individually as "external services 122A," external services 122B," and so forth).

In one example, the internal service 120A can be an enterprise data store within an organization that is serviced by the server computer 104. In another example, the external service 122C can be a web service. It should be understood that the presently disclosed subject matter can be used with any particular type of internal services 120 or external services 122 that can provide functionality as provided herein.

As noted above, the intent handler 118 can receive an input to use more than one data source. For example, the intent handler 118 can identify three external services 122 that provide hotel pricing information. The service application 114, when invoked based on a query associated with an intent, can access the three external services 122 and provide that information to a user.

The service application generator 110 uses the information to generate the service application 114. In some examples, the services application generator 110 can be used to identify an intent, allowing the service application 114 to interact with a particular data source and construct the output using the intent handler 118 provided by the service application generator 110. In some examples, the service application 114 is a component of the service application generator 110. In other example, the service application 114 is a separate component.

In some examples, as explained in more detail below, when the service application 114 is executed, the runtime side of the service application generator 110 sends the user input to the natural language service 116 to identify the intent and one or more entities of the input. The service application generator 110 then finds the user-specified intent handler 118 corresponding to the identified Intent. A RESTful service specified by the user is then invoked. In some examples, a RESTful service uses a Representational State Transfer ("REST") architectural style that specifies constraints, such as the uniform interface, that if applied to a web service induce desired properties, such as performance, scalability, and modifiability, that enable services to work efficiently or effectively on the World Wide Web. The RESTful service can return results in JSON format. The JSON format is a JavaScript Object Notification ("JSON") format. It should be noted, however that other service architectures, styles, and formats may be used. For example, in some examples, an XML format may be used rather than a JSON format. The service application 114 extracts the values specified by the user, fills those values into the user-specified template to construct the answer and then outputs the answer.

It should be noted that FIG. 1 illustrates one user device 102, one network 106, and one server computer 104. It should be understood, however, that some implementations of the operating environment 100 include multiple user devices 102, multiple networks 106, and/or multiple server computers 104. Also, FIG. 1 illustrates the service application generator 110, and other modules, as being executed by the operating system 108 of the server computer 104. It should be understood, however, that various aspects of the operating environment 100 may be provided using computing resources other than the server computer 104. In one specific example, the processes associated with the service application generator 110 may be executed using a remote computer. Thus, the illustrated configuration in FIG. 1 should be understood as being illustrative, and should not be construed as being limiting in any way.

Figure 2:
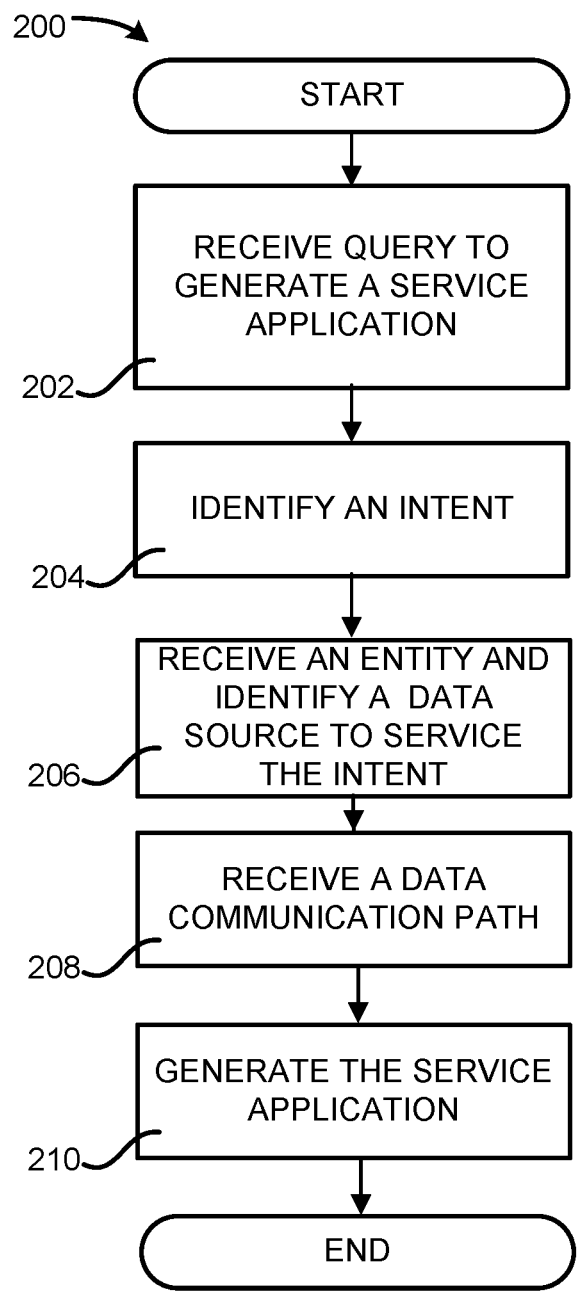
FIG. 2 is a flow diagram showing aspects of a method for generating a service application.

Turning now to FIG. 2, aspects of a method 200 for generating a service application will be described in detail. It should be understood that the operations of the method 200 are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 200 can be ended at any time and need not be performed in its entirety. Some or all operations of the method 200, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Computer-storage media does not include transitory media.

Thus, it should be appreciated that the logical operations described herein can be implemented as a sequence of computer implemented acts or program modules running on a computing system, and/or as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the technologies of the present disclosure, the method 200 disclosed herein is described as being performed by the server computer 104 via execution of computer executable instructions such as, for example, the service application generator 110. As explained above, the service application generator 110 can include functionality for generating the service application 114. As such, while the method 200 is described as being provided by the server computer 104, it should be understood that the server computer 104 can provide the functionality described herein via execution of various application program modules and/or elements. Additionally, devices other than, or in addition to, the server computer 104 can be configured to provide the functionality described herein via execution of computer executable instructions other than, or in addition to, the service application generator 110. As such, it should be understood that the described configuration is illustrative, and should not be construed as being limiting in any way.

The method 200 begins at operation 202, where the server computer 104 receives a query to generate the service application 114. As noted above, the query can be an instruction to generate the service application 114, such as "generate a service application," or the query can be a query that cannot be handled by a service application in use. It should be understood, however, that the presently disclosed subject matter is not limited to any particular manner of initiating the service application generator 110.

The method 200 continues to operation 204, an intent is identified. The intent is a command or instruction a user or other entity wishes the service application 114 to execute or perform. The intent may be generated using various technologies. For example, a proposed intent may be generated using the natural language service 116. The natural language service 116 may analyze the query and determine one or more possible intents. In other examples, one or more intents can be received from a user.

The method 200 continues to operation 206, where an entity and data source are identified. The entity can be the subject of the intent. The data source can be one or more internal services 120 and/or one or more external services 122. The internal services 120 or external services 122 are resources that provide an output to the service application 114. In some examples, the external services 122 can be Internet web services having a structure that facilitates queries and provides services or data based on the queries.

The method 200 continues to operation 208, where a data communication path is received for each intent. In some examples, the data communication path is an identifier or a set of instructions that, when used by the service application 114, provide services or data. In one example, the data path can be a URL for a web service that uses JSON. The data communication path can specific what data is to be provided from the data source. For example, a data communication path may specify a record of employees. The "employees" object, or value, from a data source can use the JSON format in the following way:

```
{"employees":[
    {"firstName":"John", "lastName":"Doe"},
    {"firstName":"Anna", "lastName":"Smith"},
    {"firstName":"Peter", "lastName":"Jones"}
]}
```

Thus, the data communication path would be a string identifying the "employees" object, or value, to return the employees. However, as noted above, the presently disclosed subject matter can use other formats. For example, the following XML format can be used by the service application 114 if so configured:

```
<employees>
    <employee>
        <firstName>John</firstName> <lastName>Doe</lastName>
    </employee>
    <employee>
        <firstName>Anna</firstName> <lastName>Smith</lastName>
    </employee>
    <employee>
        <firstName>Peter</firstName> <lastName>Jones</lastName>
    </employee>
</employees>
```

The method 200 continues to operation 210, where the service application 114 is generated. When invoked upon a receipt of an intent, the service application will direct the intent handler to seek and receive the data or service provided using the data communication path. The method 200 may thereafter end.

Figure 3:
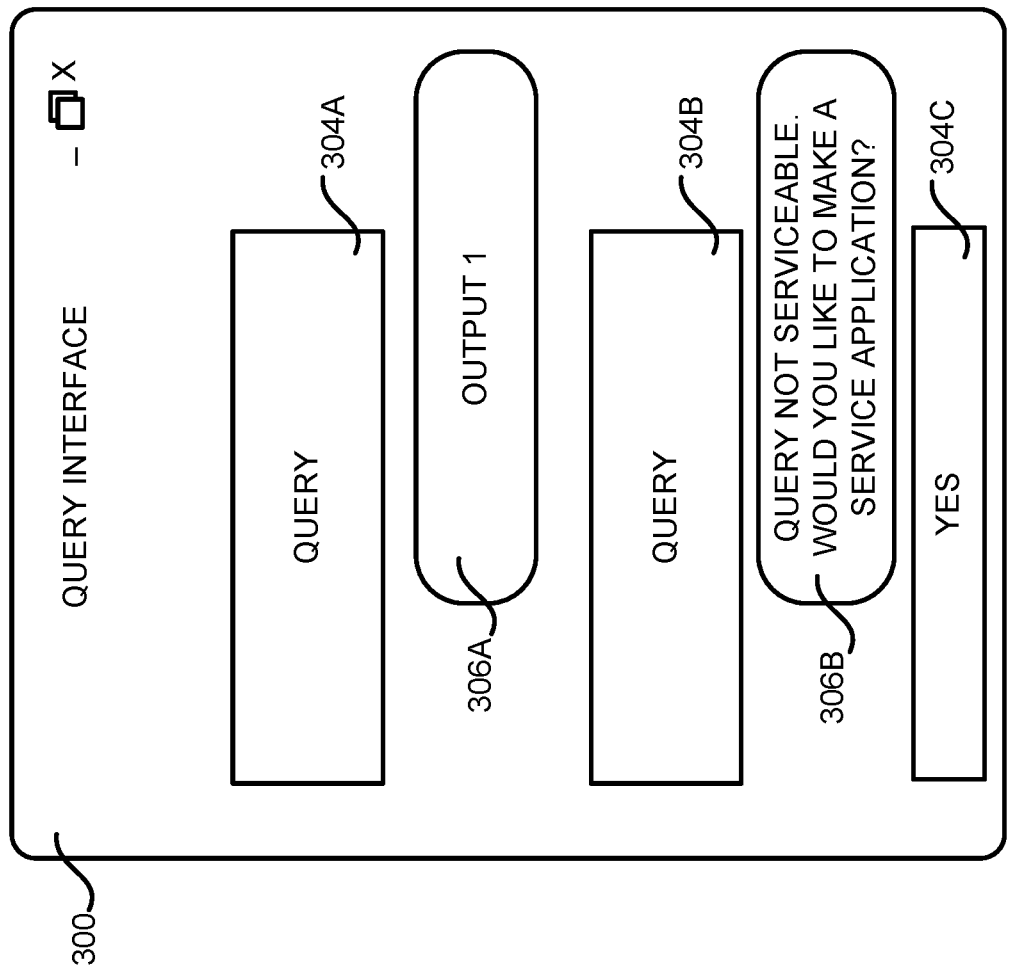
FIG. 3 shows an illustrative query interface displayed by a device.

Turning now to FIGS. 3-5, several UI diagrams showing various aspects of the technologies disclosed herein for generating a service application 114 will be described according to various examples. In particular, FIG. 3 shows an illustrative query interface 300 displayed by a device such as the user device 102. As shown in FIG. 3, the query interface 300 can provide functionality for receiving inputs 304 and displaying outputs 306.

In one example, the query 304A can be a question regarding weather at a location. The user device 102 can transmit the information received at the query interface 300 to a query service, such as the intent handler 118 of FIG. 1. The intent handler 118 can determine the intent and invoke the particular service application to handle the query 304A and generate an output 306A.

In another example, the query 304B can be question asking for a stock price of a particular company. In this example, an intent handler has not been associated with the query 304B. For example, the query 304B can include words that have not been associated with an already identified intent. In this example, the service application generator 110 may send a query 306B for display at the query interface 300 asking the user or other entity whether the user or other entity wishes to generate a service application to handle the unserviceable query 304B. It should be understood that the presently disclosed subject matter may use other methods or technologies for invoking the service application generator 110. In FIG. 3, the input 304C indicates that a user or other entity desires that the service application generator 110 generate a service application 114 to handle the query 304B.

Figure 4A:
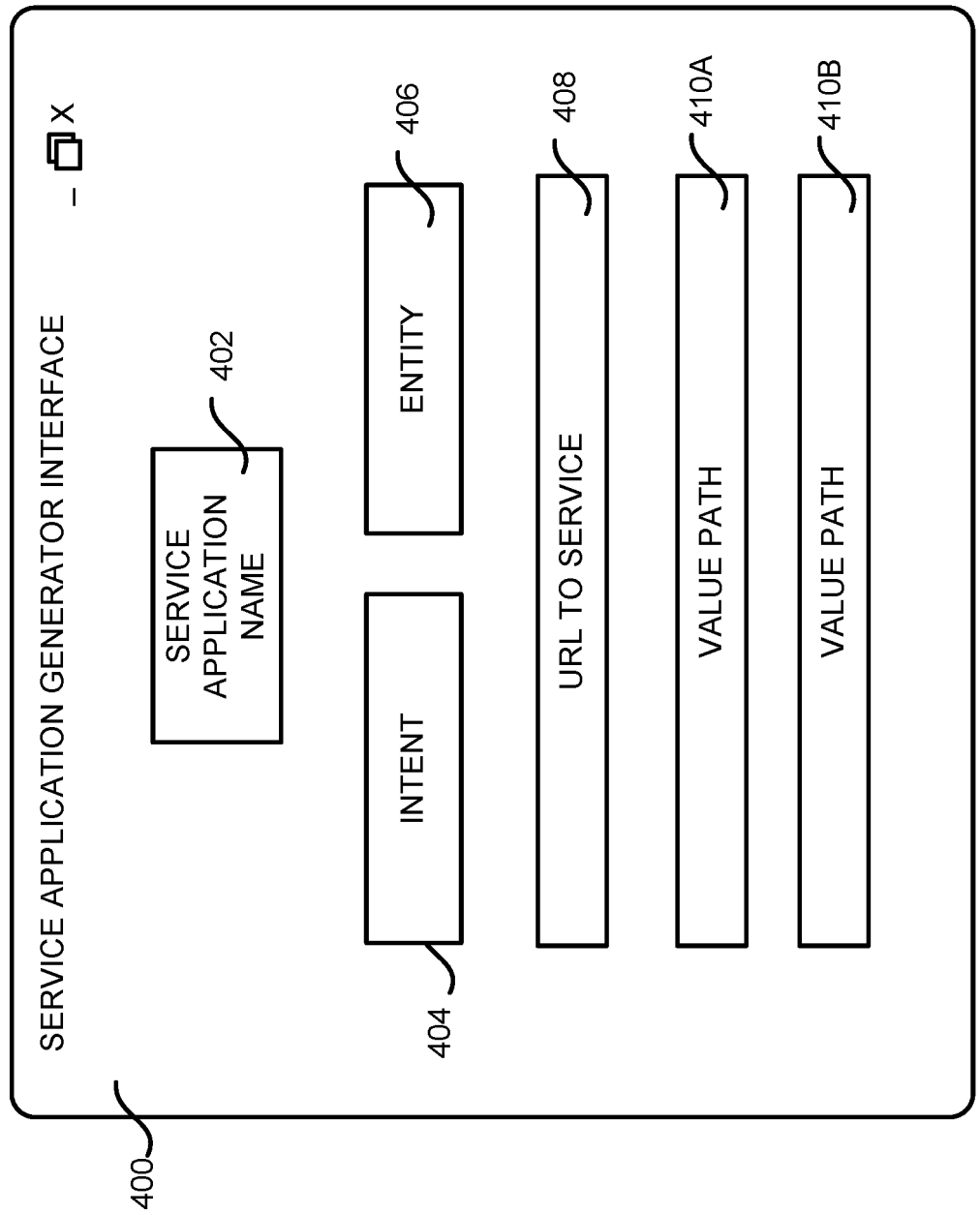
FIG. 4A is a service application generator interface invoked when a request to generate a service application is received.

FIG. 4A is an illustration of a service application generator interface 400 invoked when a request to generate a service application is received. In some examples, the service application generator interface 400 can have as an input a service application name 402. In some examples, the service application name 402 is used to identify the service application 114 to be generated. For example, the service application name 402 can be an input called, "Stockbot." When invoked or presented, the service application 114 to be generated will be identified as STOCKBOT.

The service application generator interface 400 also includes an intent input 404. The intent input 404 may be an intent determined from the query or may be an intent identified using other technologies. For example, a natural language service 116, such as the LUIS service from MICROSOFT, may be used to identify an intent. The intent is associated with an intent handler 118. When queries are received that use various natural language inputs, the queries may be analyzed. If the intent of the queries is determined to be the intent input at the intent input 404, the various queries are handled by the associated intent handler 118.

The service application generator interface 400 also includes an entity input 406. In some examples, the entity is the particular information that is used to satisfy the intent. For example, in the following query, "What is the weather in Atlanta, Ga.," the intent is WEATHER and the entity is ATLANTA, Ga.

The service application generator interface 400 also includes a URL to service input 408. The URL to service input 408 is an example of a data communication path. The URL to service input 408 instructs the service application 114 where to go to satisfy the intent.

An example URL to service input 408 is illustrated in FIG. 5. FIG. 5 is an Internet browser interface 500. The URL to service input 408 is input as URL 502. The URL 502 is http://finance.company1.com/webservice/v1/symbols/company A/quote?format=json. The URL 502 is an Internet address that can be accessed by the service application 114 to satisfy the intent of a query. In the example illustrated in FIG. 5, the URL 502 is a financial web service that provides an API to the information in the financial web service using a JSON format.

Returning to FIG. 4A, the service application generator interface 400 also includes a value path input 410A and value path input 410B. The value path input 410A and 410B can be code identifying the data values to retrieve from the information provided when accessing the web service identified by the URL to service input 408. For example, the value may be a stock price, a temperature, and the like. In some examples, each intent is associated with a URL to service input 408 and one or more value path defined in the value path input 410A and value path input 410B.

Figure 4B:
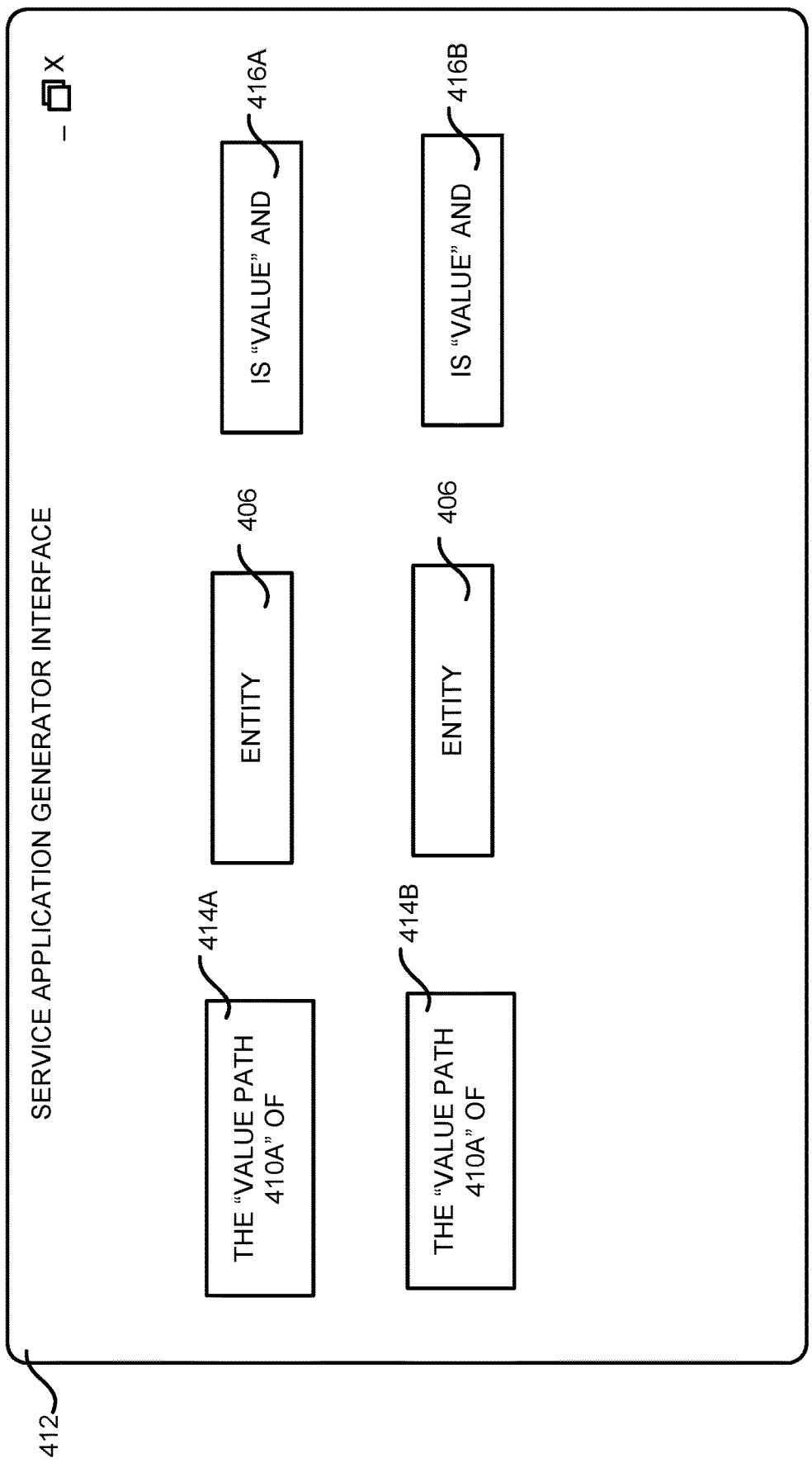
FIG. 4B is an illustration of a response template interface.

FIG. 4B is an illustration of a response template interface 412. The response template interface 412 is an interface that provides a template for a response to be generated when the service application is used. A user can move, change, add, or remove various piece of information to be displayed when the service application is used. Shown in the response template interface 412 is value path identifier 414A and value path identifier 414B. As noted in relation to FIG. 4A, above, the value path identifies the particular piece of information to be retrieved. By way of illustration, the value path identifier 414A can be "Stock Price" and the value path identifier 414B can be "Trading Volume."

The response template interface 412 also includes a value output 416A and a value output 416B. The value output 416A and the value output 416B are the data values obtained when accessing the value paths identified in the value path input 410A and value path input 410B of FIG. 4A. In the example illustrated in FIG. 4B, using the response template interface 412, response may be, "The Stock Price of Company A is 44.25 and the Trading Volume of Company A is 1 million shares." As noted above, a user can change the format of the response.

FIG. 5 provides an example of an output format (JSON) that may be used to provide the value path input 410A and value path input 410B. The URL 502 may generate output information 504. The output information 504 identifies the information provided by the web service that provides the URL 502. The value path input 410A can be the "TS" information, which may be the total shares trademark for the entity 506. Another value path input 410B can be the "PRICE" of the shares of the entity 506.

In one example, the value path input 410A may be % PRICE and the value path input 410B may be % TS. In this example, when a query is handled by the service application 114, the output generated by the service application 114 can include both the stock price and the total shares. For example, a query, "what is Company A trading at" can provide an output of "Company A is trading at 34.220001 with 1457374495 shares outstanding."

In some examples, the information of FIG. 5 may be formatted so that upon the receipt of a selection or a "click" on the "PRICE" object, the value path input 410A may be automatically populated with the correct link information. In other examples, a user may copy and paste the data communication path to the PRICE object into the value path input 410A.

Various aspect of the presently disclosed subject matter may be considered in view of the following clauses:

Clause 1. A computer-implemented method, the method comprising receiving an intent, defining an application function for the intent, receiving a location in the application function to input an entity associated with the intent, wherein the application function comprises information about a data source having information about the entity, and a data communication path defining a communication pathway to the data source, receiving a value path defining a data location of the data source to provide data to service a query, and generating the service application using the intent, the entity, the data communication path, and the value path, wherein the service application is configured to service the query.

Clause 2. The computer-implemented method of clause 1, where the value path identifies a value.

Clause 3. The computer-implemented method of clause 1 and 2, further comprising receiving a template input to define a response format to display a result of servicing the query by the service application.

Clause 4. The computer-implemented method of clauses 1 through 3, wherein the value path is provided using a JSON format or XML format.

Clause 5. The computer-implemented method of clause 4, wherein the intent is derived from the query.

Clause 6. The computer-implemented method of clauses 1 through 5, wherein the intent is derived using a natural language service.

Clause 7. The computer-implemented method of clauses 1 through 6, further comprising associating the intent with an intent handler that specifies how to process the intent using the entity.

Clause 8. A computer-readable storage medium having computer readable instructions stored thereupon that, when executed by a computer, cause the computer receive an intent, define an application function for the intent, receive a location in the application function to input an entity associated with the intent, wherein the application function comprises information about a data source having information about the entity, and a data communication path defining a communication pathway to the data source, receive a value path defining a data location of the data source to provide data to service a query, and generate the service application using the intent, the entity, the data communication path, and the value path, wherein the service application is configured to service the query.

Clause 9. The computer-readable storage medium of clause 8, where the value path identifies a value.

Clause 10. The computer-readable storage medium of clauses 8 and 9, wherein the computer readable instructions further comprising instructions receive a template input to define a response format to display a result of servicing the query by the service application.

Clause 11. The computer-readable storage medium of clauses 8 through 10, wherein the value path is provided using a JSON format or XML format.

Clause 12. The computer-readable storage medium of clauses 8 through 11, wherein the intent is derived from the query.

Clause 13. The computer-readable storage medium of clauses 8 through 12, wherein the intent is derived using a natural language service.

Clause 14. The computer-readable storage medium of clauses 8 through 13, further comprising computer readable instructions to associate the intent with an intent handler that specifies how to process the intent using the entity.

Clause 15. A system comprising: a processor; and a computer-readable storage medium in communication with the processor, the computer-readable storage medium having computer-executable instructions stored thereupon which, when executed by the processor, cause the processor initiate a user interface having inputs for an intent, an entity, a uniform resource locator (URL) to a service, and at least one value path, and generate a service application using the intent, the entity, the URL to the service, and the at least one value path.

Clause 16. The system of clause 15, wherein the intent is received from a natural language service analyzing a query.

Clause 17. The system of clauses 15 and 16, further comprising computer-executable instructions to: receive a query; determine if a second service application is available to handle the query; if in response to determining that the second service application is not available to handle the query, initiate the user interface.

Clause 18. The system of clauses 15 through 17, wherein the value path is populated by a selection of an object provided by the service.

Clause 19. The system of clauses 15 through 18, wherein the service is a RESTful service returns results in JSON format.

Clause 20. The system of clauses 15 through 19, further comprising computer-executable instructions to provide an output corresponding to a value associated with the at least one value path in response to receiving a query.

Figure 6:
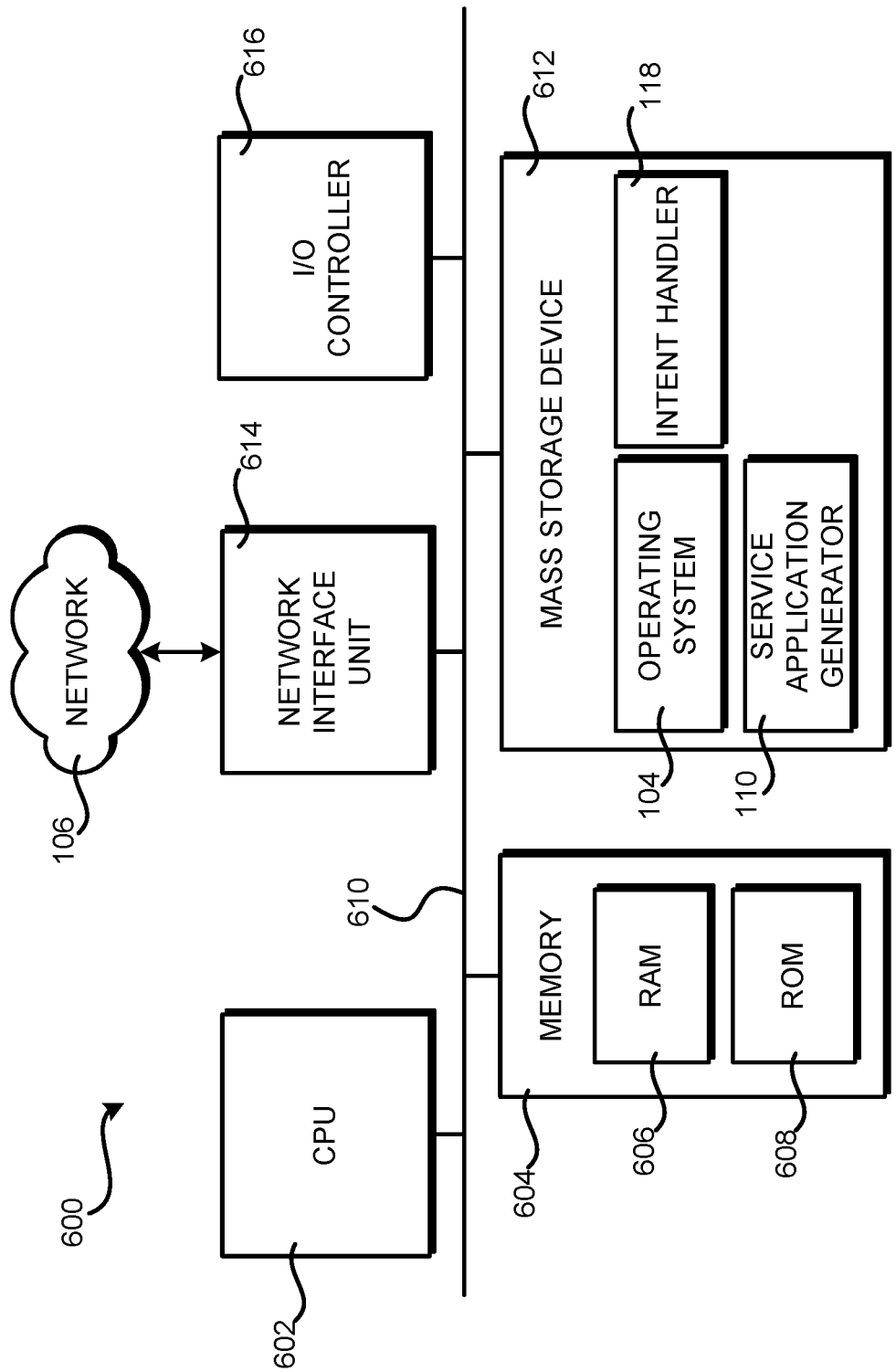
FIG. 6 is a computer architecture diagram illustrating an illustrative computer hardware and software architecture for a computing system capable of implementing aspects presented herein.

FIG. 6 illustrates an illustrative computer architecture 600 for a device capable of executing the software components described herein for generating a service application. Thus, the computer architecture 600 illustrated in FIG. 6 illustrates an architecture for a server computer, mobile phone, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing the operating system 108 and one or more application programs including, but not limited to, the service application generator 110 and the intent handler 118.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes the claims, a "computer storage medium" or "computer-readable storage medium," and variations thereof, do not include waves, signals, and/or other transitory and/or intangible communication media, per se. For the purposes of the claims, "computer-readable storage medium," and variations thereof, refers to one or more types of articles of manufacture.

According to various configurations, the computer architecture 600 may operate in a networked environment using logical connections to remote computers through a network such as the network 106. The computer architecture 600 may connect to the network 106 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Figure 7:
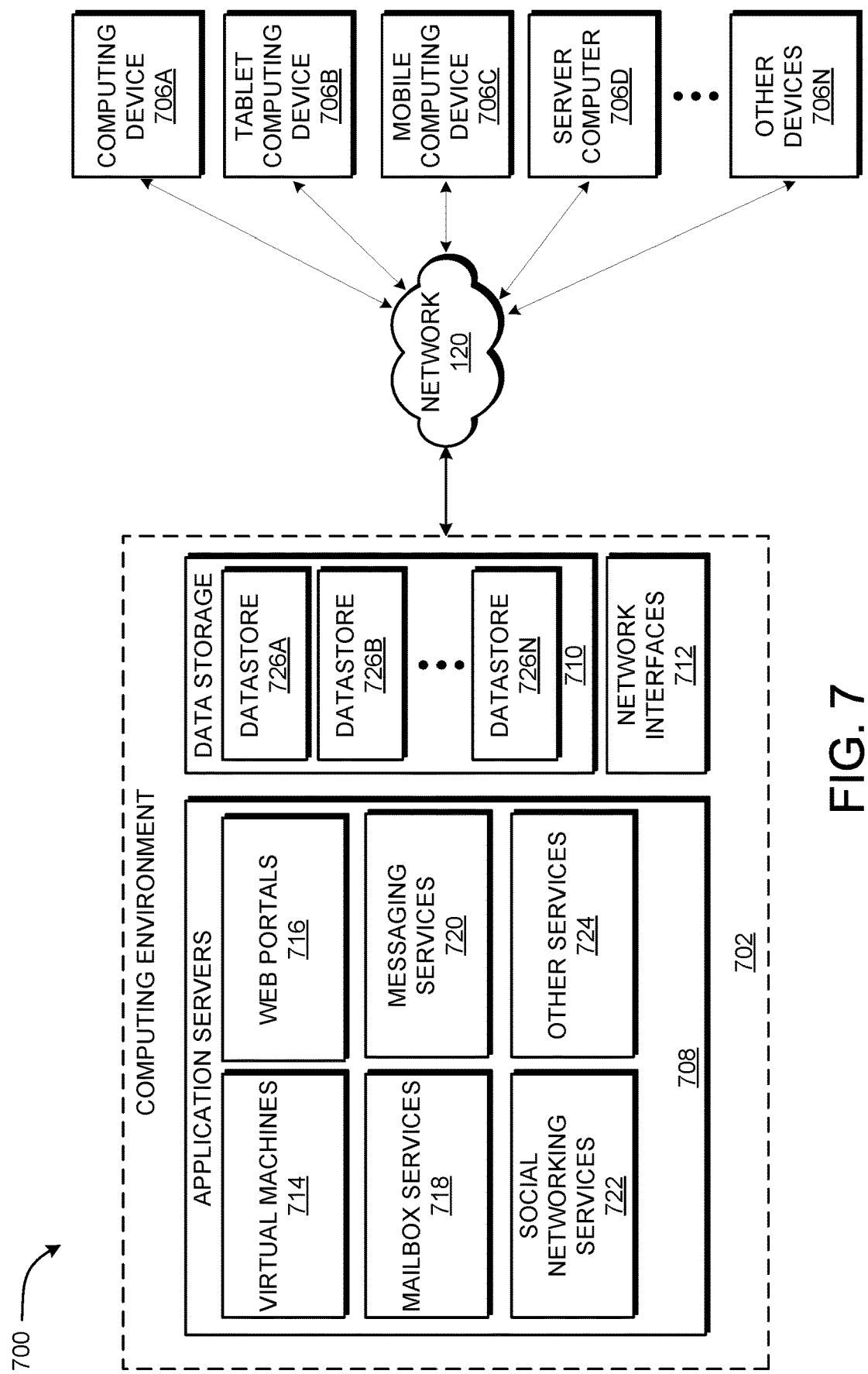
FIG. 7 is a diagram illustrating a distributed computing environment capable of implementing aspects presented herein.

FIG. 7 illustrates an illustrative distributed computing environment 700 capable of executing the software components described herein for generating a service application. Thus, the distributed computing environment 700 illustrated in FIG. 7 can be used to provide the functionality described herein with respect to the user device 102 and/or the server computer 104. The distributed computing environment 700 thus may be utilized to execute any aspects of the software components presented herein.

According to various implementations, the distributed computing environment 700 includes a computing environment 702 operating on, in communication with, or as part of the network 704. The network 704 also can include various access networks. According to various implementations, the functionality of the network 704 is provided by the network 106 illustrated in FIG. 1. One or more client devices 706A-706N (hereinafter referred to collectively and/or generically as "clients 706") can communicate with the computing environment 702 via the network 704 and/or other connections (not illustrated in FIG. 7). In the illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein with reference to FIGS. 6 and 7. It should be understood that the illustrated clients 706 and computing architectures illustrated and described herein are illustrative, and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for providing the functionality described herein for generating a service application. It should be understood that this configuration is illustrative, and should not be construed as being limiting in any way. The application servers 708 also host or provide access to one or more Web portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") services including, but not limited to, calendar services, contact management services, collaboration services, and/or other services. The messaging services 720 can include, but are not limited to, instant messaging services, chat services, forum services, and/or other communication services.

The application servers 708 also can include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 722 are provided by or include the FACEBOOK social networking service, the LINKEDIN professional networking service, the MYSPACE social networking service, the FOURSQUARE geographic networking service, the YAMMER office colleague networking service, and the like.

In other configurations, the social networking services 722 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way.

As shown in FIG. 7, the application servers 708 also can host other services, applications, portals, and/or other resources ("other resources") 724. It therefore can be appreciated that the computing environment 702 can provide integration of the technologies disclosed herein provided herein for generating a service application with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual data stores 726A-726N (hereinafter referred to collectively and/or generically as "data stores 726"). The data stores 726 are configured to host data used or created by the application servers 708 and/or other data.

The computing environment 702 can communicate with, or be accessed by, the network interfaces 712. The network interfaces 712 can include various types of network hardware and software for supporting communications between two or more computing devices including, but not limited to, the clients 706 and the application servers 708. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the technologies disclosed herein, the distributed computing environment 700 provides the software functionality described herein as a service to the clients 706. It should be understood that the clients 706 can include real or virtual machines including, but not limited to, server computers, web servers, personal computers, mobile computing devices, smart phones, and/or other devices. As such, various configurations of the technologies disclosed herein enable any device configured to access the distributed computing environment 700 to utilize the functionality described herein for generating a service application.

Figure 8:
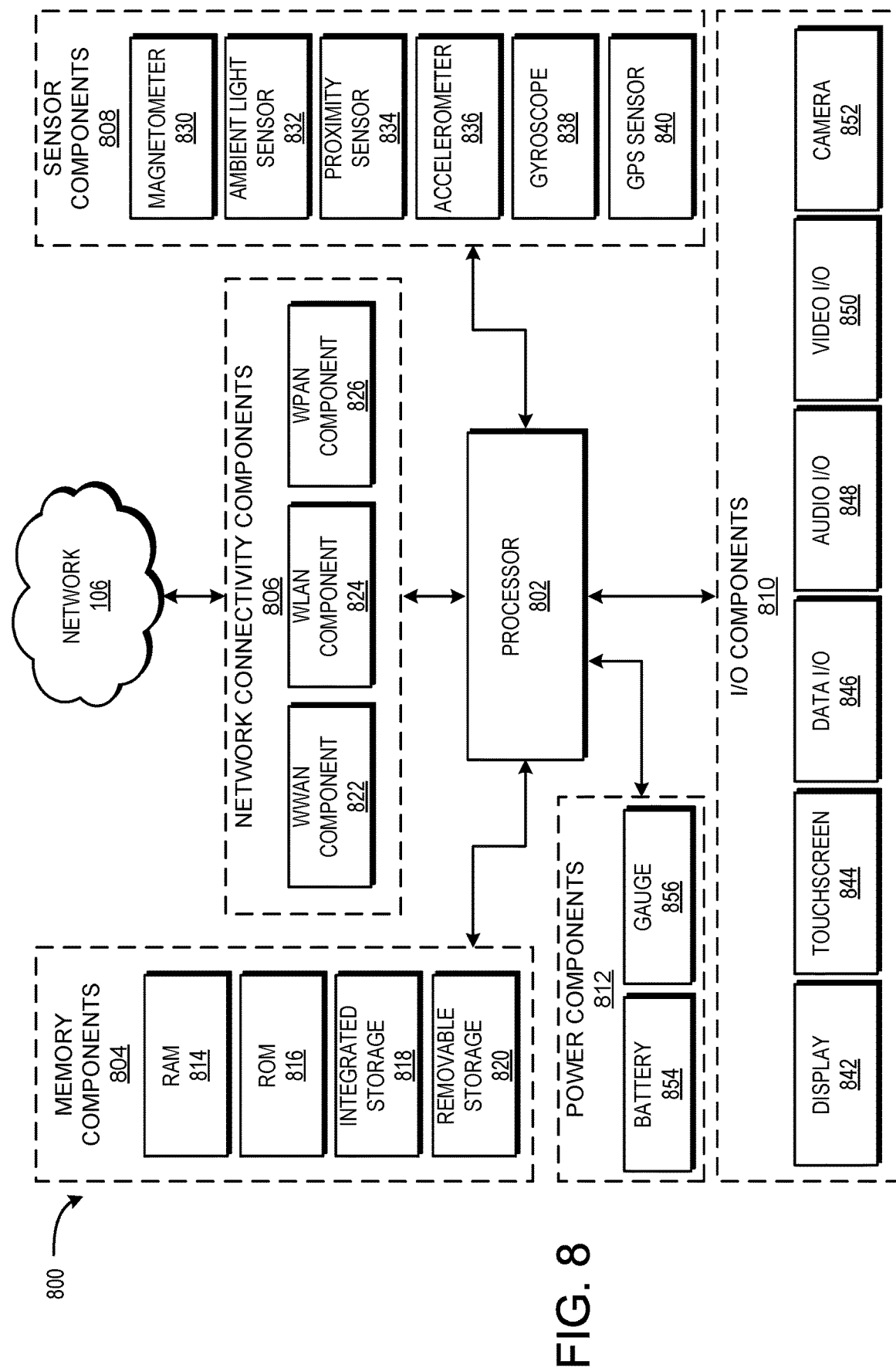
FIG. 8 is a computer architecture diagram illustrating a computing device architecture capable of implementing aspects presented herein.

Turning now to FIG. 8, an illustrative computing device architecture 600 for a computing device that is capable of executing various software components described herein for generating a service application is described. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. Moreover, the computing device architecture 800 is applicable to any of the clients 706 shown in FIG. 7. Furthermore, aspects of the computing device architecture 800 may be applicable to traditional desktop computers, portable computers (e.g., laptops, notebooks, ultra-portables, and netbooks), server computers, and other computer systems, such as described herein with reference to FIG. 6. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individuals components illustrated in FIG. 8, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, and greater), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. Moreover, the processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available and shown to a user as a total combined capacity of the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from a network 106, which may be a WWAN, a WLAN, or a WPAN. Although a single network 106 is illustrated, the network connectivity components 806 may facilitate simultaneous communication with multiple networks. For example, the network connectivity components 806 may facilitate simultaneous communications with multiple networks via one or more of a WWAN, a WLAN, or a WPAN.

The network 106 may be a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 106 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 106 may be configured to provide voice and/or data communications with any combination of the above technologies. The network 106 may be configured to or adapted to provide voice and/or data communications in accordance with future generation technologies.

In some configurations, the WWAN component 822 is configured to provide dual-multi-mode connectivity to the network 106. For example, the WWAN component 822 may be configured to provide connectivity to the network 106, wherein the network 106 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 106 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 106 via the WI-FI access points. Such connections may be secured via various encryption technologies including, but not limited, WI-FI Protected Access ("WPA"), WPA2, Wired Equivalent Privacy ("WEP"), and the like.

The network 106 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 830, an ambient light sensor 832, a proximity sensor 834, an accelerometer 836, a gyroscope 838, and a Global Positioning System sensor ("GPS sensor") 840. It is contemplated that other sensors, such as, but not limited to, temperature sensors or shock detection sensors, also may be incorporated in the computing device architecture 800.

The magnetometer 830 is configured to measure the strength and direction of a magnetic field. In some configurations the magnetometer 830 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 830 are contemplated.

The ambient light sensor 832 is configured to measure ambient light. In some configurations, the ambient light sensor 832 provides measurements to an application program stored within one the memory components 804 in order to automatically adjust the brightness of a display (described below) to compensate for low-light and high-light environments. Other uses of measurements obtained by the ambient light sensor 832 are contemplated.

The proximity sensor 834 is configured to detect the presence of an object or thing in proximity to the computing device without direct contact. In some configurations, the proximity sensor 834 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 834 are contemplated.

The accelerometer 836 is configured to measure proper acceleration. In some configurations, output from the accelerometer 836 is used by an application program as an input mechanism to control some functionality of the application program. For example, the application program may be a video game in which a character, a portion thereof, or an object is moved or otherwise manipulated in response to input received via the accelerometer 836. In some configurations, output from the accelerometer 836 is provided to an application program for use in switching between landscape and portrait modes, calculating coordinate acceleration, or detecting a fall. Other uses of the accelerometer 836 are contemplated.

The gyroscope 838 is configured to measure and maintain orientation. In some configurations, output from the gyroscope 838 is used by an application program as an input mechanism to control some functionality of the application program. For example, the gyroscope 838 can be used for accurate recognition of movement within a 3D environment of a video game application or some other application. In some configurations, an application program utilizes output from the gyroscope 838 and the accelerometer 836 to enhance control of some functionality of the application program. Other uses of the gyroscope 838 are contemplated.

The GPS sensor 840 is configured to receive signals from GPS satellites for use in calculating a location. The location calculated by the GPS sensor 840 may be used by any application program that requires or benefits from location information. For example, the location calculated by the GPS sensor 840 may be used with a navigation application program to provide directions from the location to a destination or directions from the destination to the location. Moreover, the GPS sensor 840 may be used to provide location information to an external location-based service, such as E911 service. The GPS sensor 840 may obtain location information generated via WI-FI, WIMAX, and/or cellular triangulation techniques utilizing one or more of the network connectivity components 806 to aid the GPS sensor 840 in obtaining a location fix. The GPS sensor 840 may also be used in Assisted GPS ("A-GPS") systems.

The I/O components 810 include a display 842, a touchscreen 844, a data I/O interface component ("data I/O") 846, an audio I/O interface component ("audio I/O") 848, a video I/O interface component ("video I/O") 850, and a camera 852. In some configurations, the display 842 and the touchscreen 844 are combined. In some configurations two or more of the data I/O component 846, the audio I/O component 848, and the video I/O component 850 are combined. The I/O components 810 may include discrete processors configured to support the various interface described below, or may include processing functionality built-in to the processor 802.

The display 842 is an output device configured to present information in a visual form. In particular, the display 842 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 842 is a liquid crystal display ("LCD") utilizing any active or passive matrix technology and any backlighting technology (if used). In some configurations, the display 842 is an organic light emitting diode ("OLED") display. Other display types are contemplated.

The touchscreen 844 is an input device configured to detect the presence and location of a touch. The touchscreen 844 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 844 is incorporated on top of the display 842 as a transparent layer to enable a user to use one or more touches to interact with objects or other information presented on the display 842. In other configurations, the touchscreen 844 is a touch pad incorporated on a surface of the computing device that does not include the display 842. For example, the computing device may have a touchscreen incorporated on top of the display 842 and a touch pad on a surface opposite the display 842.

In some configurations, the touchscreen 844 is a single-touch touchscreen. In other configurations, the touchscreen 844 is a multi-touch touchscreen. In some configurations, the touchscreen 844 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 844. As such, a developer may create gestures that are specific to a particular application program.

In some configurations, the touchscreen 844 supports a tap gesture in which a user taps the touchscreen 844 once on an item presented on the display 842. The tap gesture may be used for various reasons including, but not limited to, opening or launching whatever the user taps. In some configurations, the touchscreen 844 supports a double tap gesture in which a user taps the touchscreen 844 twice on an item presented on the display 842. The double tap gesture may be used for various reasons including, but not limited to, zooming in or zooming out in stages. In some configurations, the touchscreen 844 supports a tap and hold gesture in which a user taps the touchscreen 844 and maintains contact for at least a pre-defined time. The tap and hold gesture may be used for various reasons including, but not limited to, opening a context-specific menu.

In some configurations, the touchscreen 844 supports a pan gesture in which a user places a finger on the touchscreen 844 and maintains contact with the touchscreen 844 while moving the finger on the touchscreen 844. The pan gesture may be used for various reasons including, but not limited to, moving through screens, images, or menus at a controlled rate and/or indicating a command to pan or move data. Multiple finger pan gestures are also contemplated. In some configurations, the touchscreen 844 supports a flick gesture in which a user swipes a finger in the direction the user wants the screen to move. The flick gesture may be used for various reasons including, but not limited to, scrolling horizontally or vertically through menus or pages. In some configurations, the touchscreen 844 supports a pinch and stretch gesture in which a user makes a pinching motion with two fingers (e.g., thumb and forefinger) on the touchscreen 844 or moves the two fingers apart. The pinch and stretch gesture may be used for various reasons including, but not limited to, zooming gradually in or out of a web service, map, or picture.

Although the above gestures have been described with reference to the use one or more fingers for performing the gestures, other appendages such as toes or objects such as styluses may be used to interact with the touchscreen 844. As such, the above gestures should be understood as being illustrative and should not be construed as being limiting in any way.

The data I/O interface component 846 is configured to facilitate input of data to the computing device and output of data from the computing device. In some configurations, the data I/O interface component 846 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 848 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio interface component 848 includes a speaker for the output of audio signals. In some configurations, the audio I/O interface component 846 includes an optical audio cable out.

The video I/O interface component 850 is configured to provide video input and/or output capabilities to the computing device. In some configurations, the video I/O interface component 850 includes a video connector configured to receive video as input from another device (e.g., a video media player such as a DVD or BLURAY player) or send video as output to another device (e.g., a monitor, a television, or some other external display). In some configurations, the video I/O interface component 850 includes a High-Definition Multimedia Interface ("HDMI"), mini-HDMI, micro-HDMI, DisplayPort, or proprietary connector to input/output video content. In some configurations, the video I/O interface component 850 or portions thereof is combined with the audio I/O interface component 848 or portions thereof.

The camera 852 can be configured to capture still images and/or video. The camera 852 may utilize a charge coupled device ("CCD") or a complementary metal oxide semiconductor ("CMOS") image sensor to capture images. In some configurations, the camera 852 includes a flash to aid in taking pictures in low-light environments. Settings for the camera 852 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 854, which can be connected to a battery gauge 856. The batteries 854 may be rechargeable or disposable. Rechargeable battery types include, but are not limited to, lithium polymer, lithium ion, nickel cadmium, and nickel metal hydride. Each of the batteries 854 may be made of one or more cells.

The battery gauge 856 can be configured to measure battery parameters such as current, voltage, and temperature. In some configurations, the battery gauge 856 is configured to measure the effect of a battery's discharge rate, temperature, age and other factors to predict remaining life within a certain percentage of error. In some configurations, the battery gauge 856 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via a power I/O component.

Based on the foregoing, it should be appreciated that technologies for generating a service application have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, aspects of which are set forth in the following claims.

What is claimed is:

1. A computer-implemented method for enabling user-generation of a custom service application, the method comprising:
  receiving, with a processor, a natural language query;
  determining, with the processor, if an existing service application is available to handle the natural language query;
  in response to determining that no existing service application is available to handle the natural language query:
    initiating, using the processor, a service application generator,
    determining, using the service application generator, an intent of the natural language query using a natural language service;
    receiving, using the service application generator, an entity and a data source;
    receiving, using the service application generator, (i) a data communication path defining a communication pathway and (ii) a value path defining a data location of the data source, the data communication path specifying data related to the intent and the entity, and the value path comprising code used by the custom service application to obtain the data from the data source;
    generating, using the service application generator, the custom service application (i) based on the intent and the entity and (ii) based on the data communication path; and
    subsequent to the generating of the custom service application, invoking the custom service application to output a response to the natural language query using the data related to the intent and the entity.

2. The computer-implemented method of claim 1, further comprising receiving a template input to define a response format to display a result of servicing the natural language query by the custom service application, and generating a response to the natural language query based on the template input.

3. The computer-implemented method of claim 1, further comprising associating the intent with an intent handler that specifies how to process the intent using the entity.

4. The computer-implemented method of claim 1, further comprising presenting a user interface on an electronic display, the user interface configured to receive a user input defining the intent, the entity, and the value path.

5. The computer-implemented method of claim 1, wherein the value path is provided using a JSON format or XML format.

6. The computer-implemented method of claim 1, wherein the entity and the data source are received without being formatted in accordance with a particular syntax.

7. A computer-readable storage medium having computer readable instructions stored thereupon that, when executed by a computer, cause the computer to:
  receive a natural language query;
  determine if an existing service application is available to handle the natural language query;
  in response to determining that no existing service application is available to handle the natural language query, initiate a user interface used to generate a new service application, the user interface comprising inputs to:
    receive user indication of an intent and an entity of the natural language query from a data source, and
    receive (i) a data communication path defining a communication pathway and (ii) a value path defining a data location of the data source, the data communication path specifying data related to the intent and the entity, and the value path comprising code used by the new service application to obtain the data,
  generate the new service application based on the intent, the entity, and the data communication path; and
  subsequent to the generating of the new service application, invoking the new service application to:
    insert the entity into the new service application associated with the intent at a location specified within a data structure of the new service application, access, using the new service application, the data source to obtain the data related to the intent and the entity via the communication pathway, and output, from the new service application, a response to the natural language query using the data related to the intent and the entity.

8. The computer-readable storage medium of claim 7, wherein the computer readable instructions further comprise instructions to receive a template input to define a response format to display a result of servicing the natural language query by the new service application.

9. The computer-readable storage medium of claim 7, wherein the value path is provided using a JSON format or XML format.

10. The computer-readable storage medium of claim 7, wherein the intent is derived using a natural language service.

11. The computer-readable storage medium of claim 7, further comprising computer readable instructions to associate the intent with an intent handler that specifies how to process the intent using the entity.

12. The computer-readable storage medium of claim 7, wherein the user indication of the intent is received without being formatted in accordance with a particular syntax.

13. A system comprising:
a processor; and
a computer-readable storage medium in communication with the processor, the computer-readable storage medium having computer-executable instructions stored thereupon which, when executed by the processor, cause the processor to:
receive a natural language query;
determine if an existing service application is available to handle the natural language query;
in response to determining that no existing service application is available to handle the natural language query, initiate a user interface for generating a new service application, the user interface having inputs to:
receive an intent and an entity derived from the natural language query using a natural language service, and
receive (i) a data communication path defining a communication pathway and (ii) a value path defining a data location of the data source, the data communication path specifying data related to the intent and the entity to be obtained from a data source, and the value path comprising code used by the new service application to obtain the data;
generate the new service application based on the intent, the entity, and the data communication path; and
subsequent to the generating of the new service application, invoking the new service application to:
insert the entity into the new service application at a location specified within a data structure of the new service application,
access, using the new service application, the data source to obtain the data related to the intent and the entity via the communication pathway, and
output, from the new service application, a response to the natural language query using the data related to the intent and the entity.

14. The system of claim 13, wherein the value path is populated by a selection of an object.

15. The system of claim 13, wherein the new service application uses a RESTful service that returns results in JSON format.

* * * * *